United States Patent
Li et al.

(10) Patent No.: US 11,409,163 B2
(45) Date of Patent: Aug. 9, 2022

(54) COMMON DELAY FOR LCD BACKLIGHTING USING LEDS

(71) Applicant: SCT LTD., Grand Cayman (KY)

(72) Inventors: Eric Li, Milpitas, CA (US); Jim Wickenhiser, Milpitas, CA (US); Shang-Kuan Tang, Milpitas, CA (US); Sheanyih Chiou, Milpitas, CA (US); Yi Zhang, Milpitas, CA (US); Brandon Li, Milpitas, CA (US)

(73) Assignee: SCT LTD., Grand Cayman (KY)

( * ) Notice: Subject to any disclaimer, the term of this patent is extended or adjusted under 35 U.S.C. 154(b) by 0 days.

(21) Appl. No.: 17/398,603

(22) Filed: Aug. 10, 2021

(65) Prior Publication Data

US 2022/0043310 A1 Feb. 10, 2022

Related U.S. Application Data

(60) Provisional application No. 63/063,918, filed on Aug. 10, 2020.

(51) Int. Cl.
| | |
|---|---|
| *H05B 45/32* | (2020.01) |
| *G02F 1/1335* | (2006.01) |
| *G09G 3/32* | (2016.01) |
| *H05B 45/46* | (2020.01) |
| *H05B 45/325* | (2020.01) |
| *G02F 1/13357* | (2006.01) |

(52) U.S. Cl.
CPC .. *G02F 1/133612* (2021.01); *G02F 1/133603* (2013.01); *H05B 45/325* (2020.01); *H05B 45/46* (2020.01)

(58) Field of Classification Search
CPC ...... H05B 45/32; H05B 45/325; H05B 45/40; H05B 45/46; G02F 1/133603; G02F 1/133612; G09G 3/34; G09G 3/36; G09G 3/3611
See application file for complete search history.

(56) References Cited

U.S. PATENT DOCUMENTS

| | | | |
|---|---|---|---|
| 8,040,304 B2 * | 10/2011 | Huang | G09G 3/3241 345/82 |
| 8,378,939 B2 * | 2/2013 | Kimura | G09G 3/3241 345/82 |

* cited by examiner

*Primary Examiner* — Jimmy T Vu
(74) *Attorney, Agent, or Firm* — Novick, Kim & Lee, PLLC; Allen Xue

(57) ABSTRACT

An LED panel has an interleaved topology in which two adjacent LED rows in the LED panel are driven by different drivers. A delay time can be implemented between starting times two adjacent LED rows. Such an LCD panel can be employed to backlight an LCD panel in an LCD display. Implementing a delay time in driving the LED panel can reduce visual artifacts in the LCD display.

15 Claims, 5 Drawing Sheets

COMMON DELAY FOR LCD BACKLIGHTING USING LEDS

RELATED APPLICATIONS

This application claims the benefit of priority under 35 U.S.C. § 119 to U.S. Provisional Application No. 63/063,918, filed on Aug. 10, 2020, the entire contents of which are incorporated herein by reference.

BACKGROUND

1. Field of Technology

This disclosure provides an LED panel having an interleaved topology and an LCD display using the interleaved LED panel to backlight the LCD panel, as well as methods for arranging and operating the LED panel and the LCD display.

2. Description of Related Art

A liquid-Crystal Display (LCD) can be backlit using an LED panel. One of the disadvantages of LCD is its slow response time, which is related to the time for the LCD pixel to reach a stable voltage after being turned on. Further, LCD pixels in an LCD panel are turned on sequentially so that it takes one entire frame time to update all LCD pixels on the display, which introduces additional delays.

A 4K LCD TV panel (i.e., 4K LCD panel) can be used as an example to illustrate the conventional backlight methods and problems and associated problems. The 4K LCD panel has 2160 lines of LCD pixels, each line having 3840 LCD pixels, so that the LCD panel has 3840×2160 LCD pixels. As the LCD pixel has a small size, it is not feasible to use one LED pixel to backlight one LCD pixel due to cost and size limitations. One common practice is to use a group of 4 serially connected LEDs (hereinafter "the LED group") to backlight 24×24 LCD pixels (hereinafter "a 24×24 LCD group" or "the LCD group"). Note that the LED group can have more or less than 4 LEDs and the LCD group may have more or less than 24×24 LCDs.

The 4K LCD panel having 2160 lines of LCD pixels can be divided into 90 different rows of LCD groups, i.e., 2160/24=90 LCD rows. Each LCD row contains 160 LCD groups (3840/24=160) and corresponds to one LED row that contains 160 LED groups. Note that the LCD row can have more or less than 90 LCD groups. The LCD row and its corresponding LED row may have approximately the same footprint and are aligned with each other in the direction perpendicular to the LCD panel.

Pixels in the LCD panel are updated sequentially according to the video input. For example, the top LCD row in the LCD display is updated first and the bottom LCD row updated last. The time it takes to update all pixels in the LCD panel varies according to the frame rate, the size of the LCD panel, the size of the LED group, and the size of the LCD group in the LCD display. At a frame rate of 120 Hz (a frame time of 8.333 ms), it takes approximately 92.5 µs (the frame time of 8,333 µs/90 rows) to update all LCD pixels in the 90 LCD rows in the whole 4K LCD panel.

In addition, each LCD pixel can take a certain response time ($T_{response}$) to become stable after it is turned on. $T_{response}$ may be in the range of 1 ms to 7 ms and can be even higher. LCDs also have a hold time ($T_{hold}$) during which the image displayed on the LCD is stable. It is desirable to have the LED backlight only during its hold time. An exemplary $T_{hold}$ is 1.333 ms.

Most LCD panels adopt global backlighting, in which all LED groups are powered up and emit light simultaneously. However, since the LCD rows are sequentially updated, global backlighting when different LCD rows are in different stages of being updated can cause visual artifacts, e.g., motion blur. In addition, since the LEDs are lit before the LCD is stable, a portion of LED energy is wasted. Further, global backlighting also increases the load of the LED backlight driver since all LED groups are turned on at the same time, which requires a significant amount of resources.

LEDs has its own limitations. One of them is the maximum current to drive an LED with good efficiency is limited, e.g., 40 mA. The other limitation is the resolution of PWM pulse width. The smaller pulse width increment is, the harder it is to control it with precision over a large array of LED having long PCB traces. Therefore, it is desirable to have a long PWM pulse for each scan so that the maximum brightness can be higher with maximum current allowed for LED, and longer PWM pulses also allow wider pulse width increment steps.

Therefore, it is desirable to have an LED panel that operates under less stringent conditions in terms of driving current, PWM pulse width, etc. In addition, it is also desirable to provide dynamic LED backlight that corresponds to the status of individual LCD rows to reduce or avoid visual artifacts, to increase efficiencies, and to reduce cost.

SUMMARY

This summary is provided to introduce a selection of concepts in a simplified form that are further described below in the detailed description. It is not intended to identify key features or essential features of the claimed subject matter, nor is it intended to be used as an aid in determining the scope of the claimed subject matter.

In one embodiment, an LED panel has an array of lighting units arranged in a plurality of LED rows and a plurality of LED channels, each lighting unit being an individual LED pixel or a plurality of serially connected LED pixels. The plurality of LED rows are connected to two or more drivers via a plurality of scan switches, and the plurality of LED channels are connected to a plurality of current sinks or current sources. Further, the two or more drivers are connected to the plurality of LED rows in an interleaved fashion in which two adjacent LED rows among the plurality of LED rows are respectively connected to two drivers among the two or more drivers.

In another embodiment, the LED panel can be operated by sequentially driving the plurality of LED rows using the two or more drivers, in which one LED row is driven by one driver at a time, and two adjacent LED rows are respectively driven by two drivers and starting times of the driving signals are different.

In a further embodiment, an LCD display has an LCD panel and an LED panel for backlighting the LCD panel. The LED panel includes one or more LED zones. The LCD panel includes one or more LCD zones. Each LED zone is configured to backlight one of the one or more LCD zones. Each LED zone has an array of lighting units arranged in a plurality of LED rows and a plurality of LED channels, each lighting unit being an individual LED pixel or a plurality of serially connected LED pixels.

The plurality of LED rows in each LED zone are connected to two or more drivers via a plurality of scan switches, and the plurality of LED channels are connected to a plurality of current sinks or current sources.

In other embodiments, the LCD panel in the LCD display may have a screen size in the range of 5" to 100". It may have 1 to 7 LED zones. Each LED zone has 18 to 160 LED rows.

In still other embodiments, there can be 2 to 24 drivers connected to the plutlity of LED rows in each LED zone in the LED panel.

The method for backlighting the LCD display using the LED panel may contain the steps of turning on the LCD panel by turning on a first LCD pixel in a first LCD zone in the LCD panel; turning on a first LED row in a first LED zone in the LED panel that backlights the first LCD zone; sequentially driving the plurality of LED rows in the first LED zone at a delay time. "turning on" means supplying a driving single, e.g., a PWM pulse, to the LED pixels in the LED row. The rising edge of the PWM pulse is the starting time of the act of "turning on." The delay time is a time difference between starting times of two adjacent, sequentially driven LED rows.

In some embodiments, the delay time is equal to or larger than a frame time the LCD display operates at divided by a total number of LCD rows in the LCD panel.

In further embodiments, when LCD panel has more than one LCD zone and the LED panel has more than one LED zones, all the more than one LED zones sequentially driven and a delay time is implemented globally to all the LED zones, i.e., between any two adjacent, sequentially driven LED rows in the more than one LED zones.

In still an embodiment of the current disclosure, a method for selecting a PWM pulse length (Tpwm) for driving the LED panel in the LCD includes the following steps: determining a Hold-Limit Tpwm, a Frame-Limit Tpwm, and a Delay-Limit Tpwm; determining Tpwm to be less than or equal to a lowest value amongst the Hold-Limit Tpwm, the Frame-Limit Tpwm, and the Delay-Limit Tpwm; and configuring an LED driver that implements Tpwm.

The Hold-Limit Tpwm is limited by a hold time of an LCD pixel in the LCD panel and the hold time is a time period during which the LCD pixel is stable. The Frame-Limit Tpwm is limited by a frame time that the LCD display. And the Delay-Limit $T_{pwm}$ is limited by a number of LED zones in the LED panel.

BRIEF DESCRIPTION OF THE DRAWINGS

The teachings of the present invention can be readily understood by considering the following detailed description in conjunction with the accompanying drawings.

DETAILED DESCRIPTION

Figure 1:
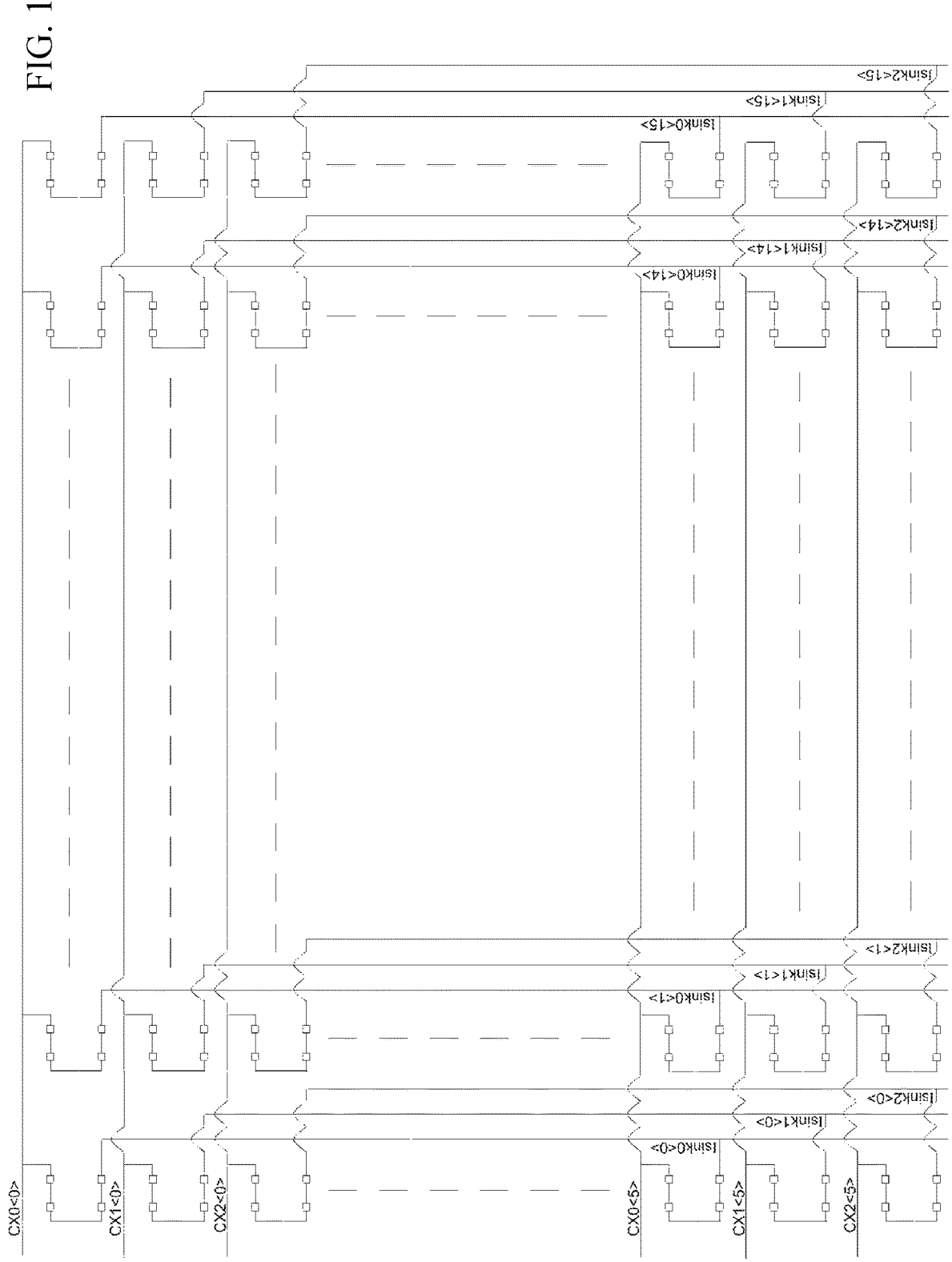
FIG. 1 illustrates an array of LED groups in a section of LED panel.

Reference will now be made in detail to embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the disclosure.

Embodiments in this disclosure uses a 4K LCD panel and its LED backlight panel as an example. However, the topology of the LED panel, the method of driving the LED panel, and the method of determining design variables and determining operating parameters are not limited to LCD display or LED backlight panels.

In this disclosure, a driver core refers to a driver circuit that drives LEDs, which may include components such as scan switches, one or more current sinks, or one or more current sources. The scan switch can be either PMOS or NMOS and the current driving circuit can be either a current sink or a current source. A driver core may reside on one driver chip. Alternatively, one driver chip may contain one or more driver cores. For example, a driver chip may contain one driver core so that it can handle a big power load, e.g., in a large LED panel. A driver chip may contain several driver cores if the power load is not high, e.g., in a small LED panel for a hand-held device. In this disclosure, "driver" and "driver core" are used interchangeably unless otherwise noted.

In one of the embodiments, while all LED groups in the same LED row are turned on simultaneously, a common delay time ($T_{comm}$) is implemented between powering any two adjacent LED rows in the LED panel. A delay time is the smallest time difference between the rising edge of a PWM pulse driving an LED row and the rising edge of a PWM pulse driving an adjacent LED row. The common delay time—$T_{comm}$—is the delay time implemented globally to all LED rows in the LED panel. $T_{comm}$ can be larger or equal to the time it takes to update all LCD pixels in the LCD panel. In the example of a 4k LCD panel running at a frame rate of 120 Hz described above, $T_{comm}$ is set at a value larger than or equal to 92.5 µs. In this disclosure, 92.5 µs is the default common delay $T_{comm}$ in the embodiments with the understanding $T_{comm}$ can be of a different value.

In another embodiment of the current disclosure, the LED row is lit after its corresponding LCD row is stable to account for LCD pixel's response time ($T_{response}$) and common delay time ($T_{comm}$).

According to one of the embodiments in this disclosure, a single LED driver core drives multiple LED rows in a scanning topology. Further, multiple LED driver cores are interleaved. "Interleave," "interleaved," or "interleaving" means that the LED rows driven by different drivers are intertwined rather than segregated as distinct blocks. For example, the first row of LEDs is driven by a first driver, the second row of LEDs are driven by a second driver, and a third row of LEDs are driven by a third driver, and such a pattern is repeated across the whole LED panel. For example, in an LED array having nine LED rows, the first driver drives rows 1, 4, 7, the second driver drives rows 2, 5, 8, while the third driver drives rows 3, 6, and 9, hence the LED array have 9 interleaved LED rows driven by 3 interleaved drivers. Note that the first driver, the second driver, and the third driver can reside on one driver chip or on three separate driver chips.

FIG. 1 is a diagram of a section of the LED panel that has 16 channels by 18 rows of LED groups—a total of 288 LED groups of 4 serially connected LED pixels. This section is referred to as a 16 (channel)×6 (scan)×3 (interleave) section because the LED groups are linked in 16 channels, connected through 6 scan switches to one of three interleaved drivers, and have a repeating pattern of 3 interleaved LED rows. The whole LED panel for the 4K LCD panel has 160×90 LED groups so it may contain 50 sections shown in FIG. 1, e.g., arranged in a 10×5 array of LED sections.

In the section of FIG. 1, 6 rows of LED groups CX0<0> to CX0<5> are driven by a first driver (Driver<0>), 6 rows of LED groups CX1<0> to CX1<5> are driven by a second driver (Driver<1>), and 6 rows LED groups CX2<0> to CX2<5> are driven by third driver (Driver<2>). The drivers are not shown in FIG. 1 for simplicity.

Figure 2:
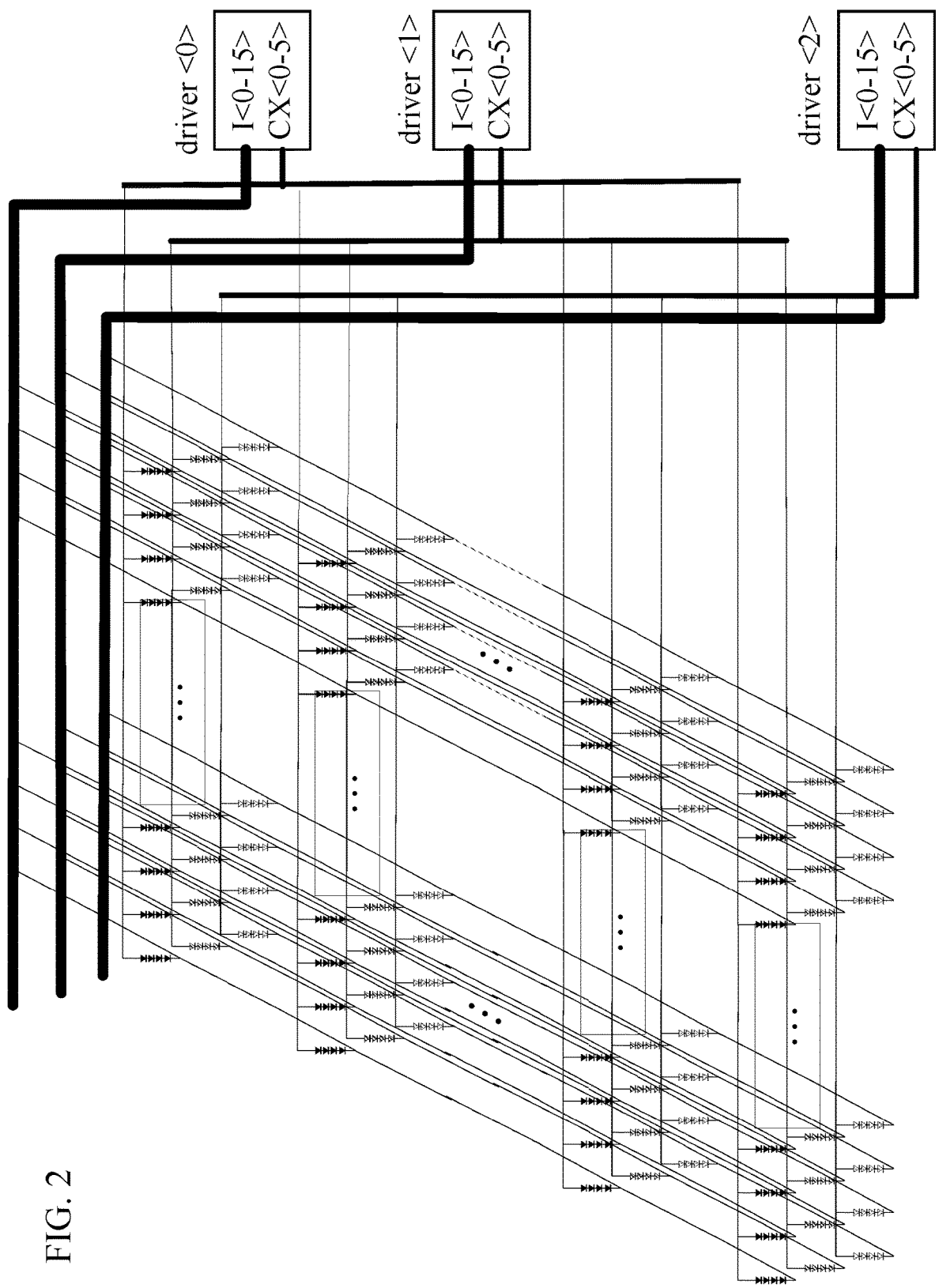
FIG. 2 is a simplified circuit diagram of the section of LED panel in FIG. 1.

FIG. 2 provides another depiction of the section of LED panel shown in FIG. 1. It shows that each LED group is connected to one of 16 current sinks $I_{sink}$<0-15> and driven by one of the driver cores Driver<0-2>. Viewing FIGS. 1 and 2 together, the channel linking the first LED group in each of rows CX0<0> to CX0<5> is connected to $I_{sink}$0<0> and driven by Driver<0>; the channel linking the second LED group in each of rows CX0<0> to CX0<5> is connected to $I_{sink}$0<1> and driven by Driver<0>; and the channel linking the last LED group (i.e., the $16^{th}$ LED group) in each of rows CX0<0> to CX0<5> is connected to $I_{sink}$0<15> and driven by Driver<0>. Likewise, the channel linking the first LED group in each of rows CX1<0> to CX1<5> is connected to $I_{sink}$1<0> and driven by Driver<1>; the channel linking the second LED groups in each of rows CX1<0> to CX1<5> is connected to $I_{sink}$1<1> and driven by Driver<1>; and the channel connects the last LED group (i.e., the $16^{th}$ LED group) in each of rows CX1<0> to CX1<5> is connected to $I_{sink}$1<15> and driven by Driver<1>. Further, the channel linking the first LED group in each of rows CX2<0> to CX2<5> is connected to $I_{sink}$2<0> and driven by Driver<2>; the channel linking the second LED groups in each of rows CX2<0> to CX2<5> is connected to $I_{sink}$2<1> and driven by Driver<2>; and the channel connects the last LED group (i.e., the $16^{th}$ LED group) in each of rows CX2<0> to CX2<5> is connected to $I_{sink}$2<15> and driven by Driver<2>.

The interleaved topology of the LED rows in FIGS. 1 and 2 enables driving a larger array of LEDs in comparison with the traditional topology in which the one driver drives six adjacent rows. Because, rather than driving in a six-row block during the time of one scan, the interleaved topology allow driving the LEDs in an area of 18-row block in approximately same amount of time.

There are certain constraints for the interleaved topology described above. For example, IR drop prevents driver cores to drive a large area of LCD display (e.g., 20 cm or more depth) in an interleaved topology. Accordingly, factors such as the physical size of LCD panel and the distance between the driver cores limit the extent of number of interleaving drivers. For example, for a phone or a notebook, all driver cores may be interleaved with one another since the LED driver cores are arranged in a small area. On the other hand, for the LED backlight panel in an LCD TV, the distance between a driver core at one end of the panel can be far apart of a driver core at the other end of the panel for them to control the same area of LEDs.

Using the LED backlight panel of the 4K LCD panel as an example, it contains an array of 50 of the 16×6×3 section shown in FIGS. 1 and 2. Each section has 3 interleaved driver cores. Accordingly, there are a total of 150 driver cores distributed across the LED backlight panel arranged in rows and columns. Multiple LED driver cores may drive LED interleaved in a given area of the LED panel as long as negative effects are negligible, e.g., IR drop is sufficiently small.

In this disclosure, a block of LED groups in which a number of driver cores drive LED in the interleaved fashion is called a zone. The LED backlight panel for a large LCD panel can be divided into multiple zones. The section of the LED panel shown in FIGS. 1 and 2 can be such a zone. Each zone has a certain dimension, e.g., less than 20 cm. The zone can larger or smaller than that in FIGS. 1 and 2. For example, instead of 3 interleaved drivers, each driving 6 row of LED groups, a zone may have 2 interleaved drivers or 4 or more interleaved drivers, each driving 6 rows of LED groups. Further a zone may have more or less number of channels that is shown in FIGS. 1 and 2.

Figure 3:
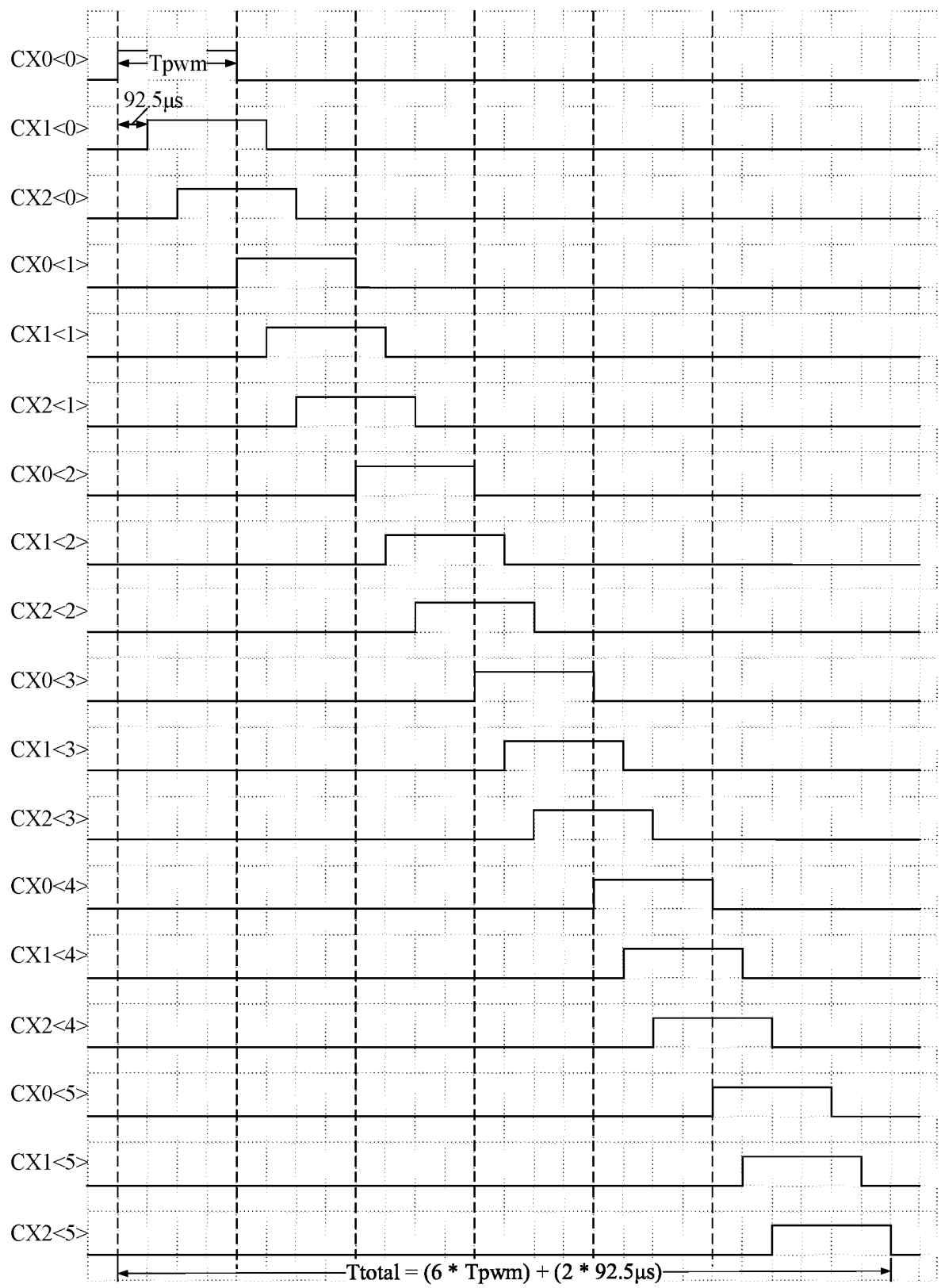
FIG. 3 is the timing diagram of the section of LED panel in FIGS. 1 and 2.

FIG. 3 is an exemplary timing diagram for an LED backlight zone. $T_{pwm}$ is the amount of time an LED group is lit per frame. The same $T_{pwm}$ shall be sequentially applied to all LED rows after the LCD is stable. A common delay time between the rising edges of two adjacent PWM pulses respectively driving two adjacent LED rows is $T_{comm}$ of 92.5 µs. The delay time between the starting time of last LED row of the current scan and the starting time of the first LED row of next scan, which is called "scan delay" in this disclosure, shall be larger or equal to $T_{comm}$. The actual scan delay time between scans depends on the value of $T_{pwm}$. When $T_{pwm}$>n×$T_{comm}$, n being the number of interleaved driver cores (n=3 in FIGS. 1 and 2), the scan delay time between two LED rows equals $T_{pwm}$−(n−1)×$T_{comm}$. When $T_{pwm}$=n× $T_{comm}$, the scan delay time can be $T_{comm}$.

The entire LED backlight panel for a 4K LCD panel can be divided into 5 zones, the delay between adjacent zones ("zone delay") equals the product of total LED rows per zone and $T_{comm}$. The 4K LCD panel can be similarly divided into 5 LCD zone, each LCD zone backlit by one corresponding LED zone.

Figure 4:
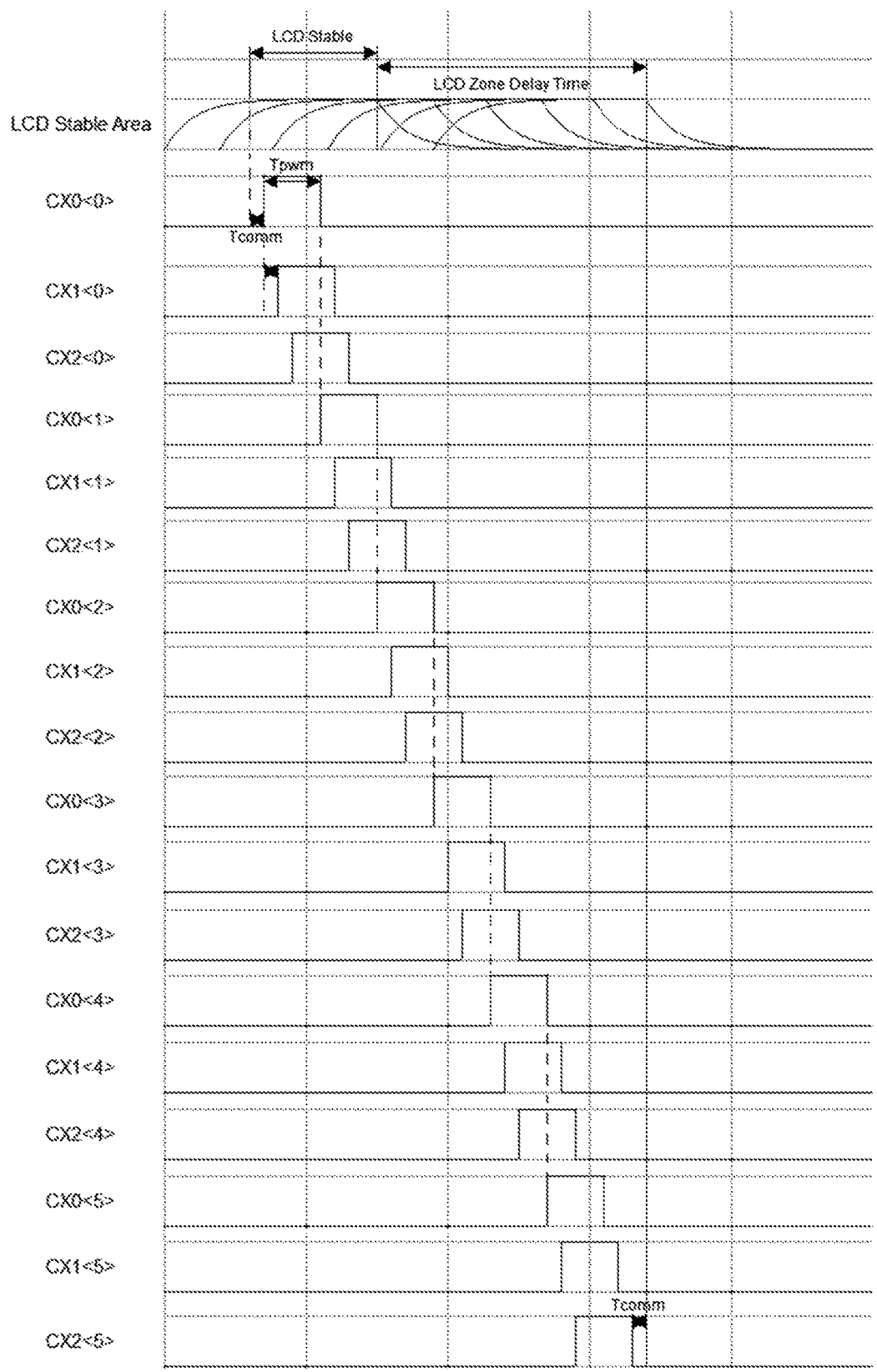
FIG. 4 illustrates the voltage response of an LCD zone and its relationship with its corresponding backlight LED zone.
Figure 5:
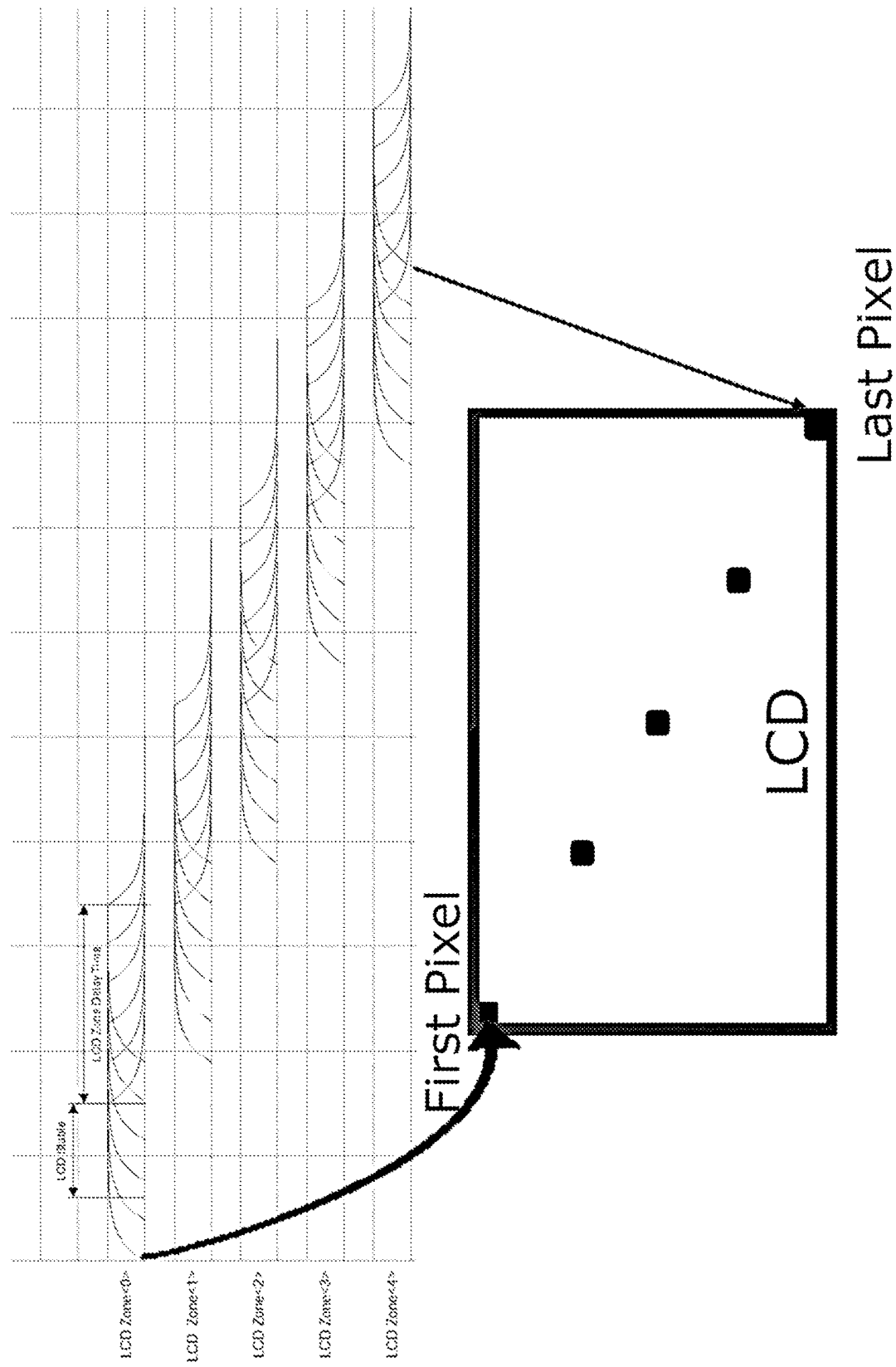
FIG. 5 illustrates the voltage response of 5 different LCD zones in an LCD display panel.

FIG. 4 shows the voltage response of an LCD zone and its relationship with its corresponding backlight LED zone having 18 LED rows. The LCD stable time FIG. 4 indicates that stable time period of the first LCD group. FIG. 5 shows the delay in five zones from the first LCD pixel in the first row to the last LCD pixel in the last row. The LCD zone delay time is the sum of all delays in updating the LCD pixels in the same zone. The LED is then timed to compensate this delay.

As shown in FIG. 4, the interleaved topology enables significant overlaps amongst three consecutive PWM pulses, which increases the light output. It also enhances local dimming control as the PWM increment step is relative larger compared with that in a standard scan topology, assuming the LED groups are driving at same maximum current and same maximum clock speed allowed in LED driver. In other words, it is more difficult to reduce motion blur in an LED panel having the standard scan topology reducing motion blur because it does not produce a sufficiently high light output (i.e., not bright enough) and its local dimming adjustment does not have enough bit depth.

Another significant advantage is that the interleaved scan topology sees less power fluctuation. The standard scan topology turns on and off the channel when switching from one scan to another so that the power supply sees high frequency output current fluctuations. The current fluctuation increases EMI and reduces the lifetime of the power supply. With interleaved scan topology, most of the time multiple rows of LED are simultaneously on so the driving current is continuously drawn from power supply, which significantly reduces the number of high frequency current spikes the power supply experiences.

Table 1 shows the relationship amongst parameters of the 4K LCD panel of different sizes backlit by corresponding LED backlight panels. It assumes a frame rate of 120 Hz, a response time of 7 ms, and $T_{hold}$ of 1333.33 μs.

In Table 1, "Zone No." is the number of zones the LED panel is divided into, which is a design choice limited by factors such as the IR drop. "Zone delay" is the total delay time in one zone, which equals 1/(number of zones*frame rate). "Total rows" is the total number rows of LED groups in the whole LED panel, which is a design choice. "Scan No. S" is the number of scans, i.e., the number of scan lines that each driver is connected to. The scan number is 6, or S=6, in the example of FIGS. 1 and 2. "Rows per zone" is the number of LED rows in each zone. N is the number of interleaved LED drivers in each zone minus one. "Pitch" is the pitch size of the LED pixel, which is a design choice. "$T_{comm}$" is the common delay for the whole LED panel, which equals 1/(frame rate*total rows).

The higher the maximum $T_{pwm}$ is, the brighter the LED panel can be, which has the advantage of providing a higher dynamic range. However, $T_{pwm}$ is subjected to several limitations in addition to the cost of material and labor.

First, $T_{pwm}$ plus $T_{comm}$ cannot be longer than $T_{hold}$ so the maximum $T_{pwm}$ cannot exceed ($T_{hold}-T_{comm}$), which is "Hold-Limit $T_{pwm}$" in Table 1. It is readily understandable that $T_{comm}$ must be less than $T_{hold}$ otherwise $T_{pwm}$ becomes negative.

Second, $T_{pwm}$ is also limited by the frame time in that $T_{frame} >= S*T_{pwm}+N*T_{comm}$. $T_{pwm}$ calculated according to this limitation is designated as "Frame-Limit $T_{pwm}$" in Table 1.

Further, $T_{pwm}$ can be limited by the length of delay in zone delay ($T_{delay}$) according the equation $T_{hold}+T_{delay} >= S*T_{pwm}+(N+2)*T_{comm}$. $T_{pwm}$ thus obtained is designated as "Delay-Limit $T_{pwm}$."

"Design $T_{pwm}$" is the lowest amongst "Hold-Limit $T_{pwm}$," "Frame-Limit $T_{pwm}$," and "Delay-Limit $T_{pwm}$." It is the highest $T_{pwm}$ for the LED drivers in the corresponding LED panel configuration. The LED drivers can be designed according to its value. The implementation of the common delay in driving LEDs can be accomplished by proper design and configuration of the PWM generators.

With this set of design parameters and constraints, Table 1 outputs Design $T_{pwm}$—the theoretical maximum amount of time LED is lit per frame. Several observations can be made. First, larger LCD panels require multiple zones in its backlight LED panel while small LCD panels only requires one zone. The turning point is between the LCD panel size of 15.6" and the LCD panel size of 14". Note that all zones employ interleaved drivers.

Second, for larger LED panels, Design $T_{pwm}$ is limited by Delay-Limit $T_{pwm}$ which is the length of delay in zone delay ($T_{delay}$) according the equation $T_{hold}+T_{delay} >= S*T_{pwm}+(N+2)*T_{comm}$. For smaller LED panels, Design $T_{pwm}$ is limited by Hold-Limit $T_{pwm}$ and equals $T_{hold}-T_{comm}$. The turning point is again between the LCD panel size of 15.6" and the LCD panel size of 14".

Design $T_{pwm}$ in Table 1 is neither the only solution nor the optimum one. Much depends on the design parameters such as interleave number, scan number, and pitch size. Table 1 illustrates an exemplary method to estimate maximum $T_{pwm}$ known a plurality of design parameters.

In summary, the implementing a common delay in scan driving of an LED backlight panel enjoys several advantages over conventional LED backlighting methods. Implementing a common delay time between consecutive LED rows reduces blurring in scan backlight. It utilizes the slow response time and the common delay to allow a longer $T_{pwm}$ for the LED pixels so that the LED has a better contrast ratio. The interleaved topology of the LED panel takes advantage of the LCD slow respond time and long update delay into power saving, output performance improvement, and lower the bill of material by sharing resources amongst driver cores. This in turn allows the during the number of LED drivers and enables efficient powering of LEDs so that the overall power consumption as well as the current fluctuation are lower.

While embodiments of this disclosure have been shown and described, modifications can be made by one skilled in the art without departing from the spirit or teaching of this invention. The embodiments described herein are exemplary only and are not limiting. Many variations and modifications of methods, systems and apparatuses are possible and are within the scope of the invention.

For example, the LED panel having an interleaved topology can be used a stand-alone device rather than a backlight panel for an LCD panel in the LCD. Such an LED panel may be driven according to the specific application it is used for and not necessarily requires the implementation of a common delay time. Further, the delay time for different zones or row of the LED panel may differ to better serve the specific applications.

Accordingly, the scope of protection is not limited to the embodiments described herein. The scope of protection is only limited by the claims. The scope of the claims shall include all equivalents of the subject matter of the claims.

TABLE 1

| LCD Size | Panel H (cm) | Zone No. | Zone H (cm) | Zone delay (μs) | Total Rows | Scan No. S | Rows per zone | N | Pitch Size (mm) | $T_{comm}$ (μs) | Delay-Limit $T_{pwm}$ (μs) | Hold-Limit $T_{pwm}$ (μs) | Frame-Limit $T_{pwm}$ (μs) | Design $T_{pwm}$ (μs) |
|---|---|---|---|---|---|---|---|---|---|---|---|---|---|---|
| 98" | 122.1 | 7 | 17.44 | 1190.48 | 140 | 4 | 5 | 4 | 4.36 | 59.52 | 541.67 | 1273.81 | 1994.05 | 541.67 |
| 85" | 105.9 | 6 | 17.65 | 1388.89 | 120 | 4 | 5 | 4 | 4.41 | 69.44 | 576.39 | 1263.89 | 1979.17 | 576.39 |
| 80" | 99.6 | 6 | 16.60 | 1388.89 | 120 | 4 | 5 | 4 | 4.15 | 69.44 | 576.39 | 1263.89 | 1979.17 | 576.39 |
| 75" | 93.5 | 5 | 18.70 | 1666.67 | 100 | 4 | 5 | 4 | 4.68 | 83.33 | 625.00 | 1250.00 | 1958.33 | 625.00 |
| 70" | 87.1 | 5 | 17.42 | 1666.67 | 100 | 5 | 4 | 3 | 4.36 | 83.33 | 516.67 | 1250.00 | 1583.33 | 516.67 |
| 65" | 81 | 5 | 16.20 | 1666.67 | 100 | 5 | 4 | 3 | 4.05 | 83.33 | 516.67 | 1250.00 | 1583.33 | 516.67 |
| 60" | 74.7 | 4 | 18.68 | 2083.33 | 96 | 6 | 4 | 3 | 3.89 | 86.81 | 497.11 | 1246.53 | 1316.55 | 497.11 |
| 55" | 68.6 | 4 | 17.15 | 2083.33 | 96 | 6 | 4 | 3 | 3.57 | 86.81 | 497.11 | 1246.53 | 1316.55 | 497.11. |
| 50" | 62.2 | 4 | 15.55 | 2083.33 | 96 | 6 | 4 | 3 | 3.24 | 86.81 | 497.11 | 1246.53 | 1316.55 | 497.11 |
| 43" | 53.6 | 3 | 17.87 | 2777.78 | 72 | 6 | 4 | 3 | 3.72 | 115.74 | 588.73 | 1217.59 | 1292.44 | 588.73 |
| 40" | 49.8 | 3 | 16.60 | 2777.78 | 72 | 6 | 4 | 3 | 3.46 | 115.74 | 588.73 | 1217.59 | 1292.44 | 588.73 |
| 37" | 39.9 | 3 | 13.30 | 2777.78 | 72 | 6 | 4 | 3 | 2.77 | 115.74 | 588.73 | 1217.59 | 1292.44 | 588.73 |
| 27" | 33.7 | 2 | 16.85 | 4166.67 | 60 | 6 | 5 | 4 | 2.81 | 138.89 | 777.78 | 1194.44 | 1250.00 | 777.78 |

TABLE 1-continued

| LCD Size | Panel H (cm) | Zone No. | Zone H (cm) | Zone delay (µs) | Total Rows | Scan No. S | Rows per zone | N | Pitch Size (mm) | $T_{comm}$ (µs) | Delay-Limit $T_{pwm}$ (µs) | Hold-Limit $T_{pwm}$ (µs) | Frame-Limit $T_{pwm}$ (µs) | Design $T_{pwm}$ (µs) |
|---|---|---|---|---|---|---|---|---|---|---|---|---|---|---|
| 24" | 29.9 | 2 | 14.95 | 4166.67 | 60 | 6 | 5 | 4 | 2.49 | 138.89 | 777.78 | 1194.44 | 1250.00 | 777.78 |
| 22" | 27.4 | 2 | 13.70 | 4166.67 | 60 | 6 | 5 | 4 | 2.28 | 138.89 | 777.78 | 1194.44 | 1250.00 | 777.78 |
| 18.4" | 22.9 | 2 | 11.45 | 4166.67 | 48 | 6 | 4 | 3 | 2.39 | 173.61 | 771.99 | 1159.72 | 1244.21 | 771.99 |
| 17.3" | 21.53 | 2 | 10.77 | 4166.67 | 48 | 6 | 4 | 3 | 2.24 | 173.61 | 771.99 | 1159.72 | 1244.21 | 771.99 |
| 15.6" | 19.4 | 2 | 9.70 | 4166.67 | 48 | 6 | 4 | 3 | 2.02 | 173.61 | 771.99 | 1159.72 | 1244.21 | 771.99 |
| 14" | 17.4 | 1 | 17.40 | 8333.33 | 36 | 6 | 6 | 5 | 2.42 | 231.48 | 1341.05 | 1101.85 | 1118.83 | 1101.85 |
| 13.3" | 16.53 | 1 | 16.53 | 8333.33 | 36 | 6 | 6 | 5 | 2.30 | 231.48 | 1341.05 | 1101.85 | 1118.83 | 1101.85 |
| 12.9" | 16 | 1 | 16.00 | 8333.33 | 36 | 6 | 6 | 5 | 2.22 | 231.48 | 1341.05 | 1101.85 | 1118.83 | 1101.85 |
| 11.6" | 14.38 | 1 | 14.38 | 8333.33 | 36 | 6 | 6 | 5 | 2.00 | 231.48 | 1341.05 | 1101.85 | 1118.83 | 1101.85 |
| 10.5" | 13 | 1 | 13.00 | 8333.33 | 24 | 6 | 4 | 3 | 2.71 | 347.22 | 1321.76 | 986.11 | 1099.54 | 986.11 |
| 9.7" | 12 | 1 | 12.00 | 8333.33 | 24 | 6 | 4 | 3 | 2.50 | 347.22 | 1321.76 | 986.11 | 1099.54 | 986.11 |
| 7.9" | 9.77 | 1 | 9.77 | 8333.33 | 24 | 6 | 4 | 3 | 2.04 | 347.22 | 1321.76 | 986.11 | 1099.54 | 986.11 |
| 6.7" | 8.29 | 1 | 8.29 | 8333.33 | 18 | 6 | 3 | 2 | 2.30 | 462.96 | 1302.47 | 870.37 | 1080.25 | 870.37 |
| 6.1" | 7.55 | 1 | 7.55 | 8333.33 | 18 | 6 | 3 | 2 | 2.10 | 462.96 | 1302.47 | 870.37 | 1080.25 | 870.37 |
| 5.4" | 6.68 | 1 | 6.68 | 8333.33 | 18 | 6 | 3 | 2 | 1.86 | 462.96 | 1302.47 | 870.37 | 1080.25 | 870.37 |

We claim:

1. An LED panel comprising an array of lighting units arranged in a plurality of LED rows and a plurality of LED channels, each lighting unit being an individual LED pixel or a plurality of serially connected LED pixels,
   wherein the plurality of LED rows are connected to two or more drivers via a plurality of scan switches, and the plurality of LED channels are connected to a plurality of current sinks or current sources, and
   wherein the two or more drivers are connected to the plurality of LED rows in an interleaved fashion in which two adjacent LED rows among the plurality of LED rows are respectively connected to two drivers among the two or more drivers.

2. The LED panel of claim 1, wherein a number of the two or more drivers ranges from 2 to 24.

3. A method for operating the LED panel of claim 1, comprising sequentially driving the plurality of LED rows using the two or more drivers, wherein one LED row is driven by one driver at a time, and two adjacent LED rows are respectively driven by two drivers and starting times of driving signals from the two drivers are different.

4. An LCD display comprising an LCD panel and an LED panel for backlighting the LCD panel, wherein the LED panel comprises one or more LED zones, the LCD panel comprises one or more LCD zones, each LED zone is configured to backlight one of the one or more LCD zones,
   wherein each LCD zone comprises an array of LCD pixels,
   wherein each LED zone comprises an array of lighting units arranged in a plurality of LED rows and a plurality of LED channels, each lighting unit being an individual LED pixel or a plurality of serially connected LED pixels,
   wherein the plurality of LED rows in each LED zone are connected to two or more drivers via a plurality of scan switches, and the plurality of LED channels are connected to a plurality of current sinks or current sources, and
   wherein the two or more drivers are connected to the plurality of LED rows in an interleaved fashion in which two adjacent LED rows among the plurality of LED rows are respectively connected to two drivers among the two or more drivers.

5. The LCD panel of claim 4, wherein the LCD panel has a screen size in a range of 5" to 100".

6. The LED panel of claim 4, wherein the number of LED zones is in a range of 1 to 7.

7. The LED panel of claim 4, wherein each LED zone has 18 to 160 LED rows.

8. The LED panel of claim 4, wherein the plurality of LED rows in each LED zone are connected to 2 to 24 drivers.

9. The LED panel of claim 4, wherein the lighting unit is a group of four serially connected LED pixels.

10. A method for backlighting the LCD display of claim 4, comprising:
    turning on the LCD panel by turning on a first LCD pixel in a first LCD zone in the LCD panel;
    turning on a first LED row in a first LED zone in the LED panel that backlights the first LCD zone; and
    sequentially driving the plurality of LED rows in the first LED zone at a delay time, wherein the delay time is a time difference between starting times of two adjacent, sequentially driven LED rows.

11. The method of claim 10, wherein the delay time is equal to or larger than a frame time the LCD display operates at divided by a total number of LCD rows in the LCD panel.

12. The method of claim 11, wherein the delay time is less than a hold time of an LCD pixel in the LCD panel, and the hold time is a time period during which the LCD pixel is stable.

13. The method of claim 10, further comprising, when the LCD panel has more than one LCD zone and the LED panel has more than one LED zones, driving all the more than one LED zones sequentially and implementing a delay time between any two adjacent, sequentially driven LED rows in the more than one LED zones.

14. The method of claim 10, wherein the two adjacent, sequentially driven LED rows are respectively driven by two drivers among the two or more drivers.

15. A method for selecting a PWM pulse length ($T_{pwm}$) for driving the LED panel in the LCD display of claim 4, comprising:
    determining a Hold-Limit $T_{pwm}$, a Frame-Limit $T_{pwm}$, and a Delay-Limit $T_{pwm}$;
    determining $T_{pwm}$ to be less than or equal to a lowest value amongst the Hold-Limit $T_{pwm}$, the Frame-Limit $T_{pwm}$, and the Delay-Limit $T_{pwm}$; and
    configuring an LED driver that implements $T_{pwm}$,
    wherein the Hold-Limit $T_{pwm}$ is limited by a hold time of an LCD pixel in the LCD panel,
    wherein the hold time is a time period during which the LCD pixel is stable, wherein the Frame-Limit $T_{pwm}$ is limited by a frame time that the LCD display,
and wherein the Delay-Limit $T_{pwm}$ is limited by a number of LED zones in the LED panel.

\* \* \* \* \*